No. 709,815. Patented Sept. 23, 1902.
H. S. COLLINS.
PIPE HANGER.
(Application filed Feb. 15, 1902.)
(No Model.)
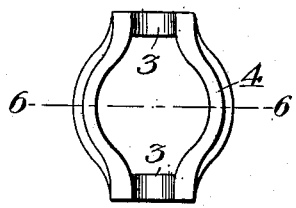
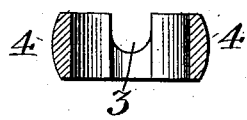
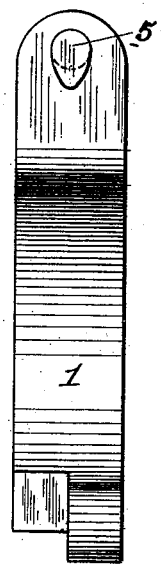
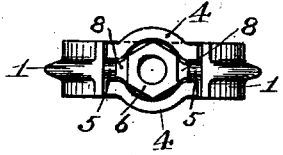
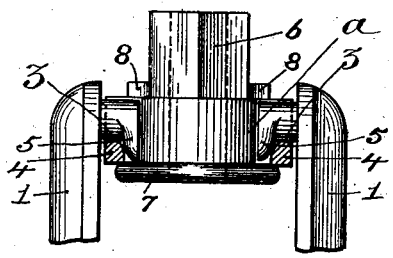
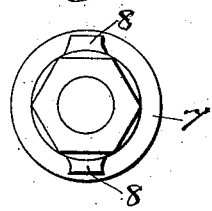
Witnesses:
C. H. Williams
James C. Herron.
Inventor:
Harry S. Collins
by John H. Roney
Attorney.
THE NORRIS PETERS CO., PHOTO-LITHO., WASHINGTON, D. C.

UNITED STATES PATENT OFFICE.

HARRY S. COLLINS, OF PITTSBURG, PENNSYLVANIA, ASSIGNOR TO COLLINS MANUFACTURING COMPANY, OF PITTSBURG, PENNSYLVANIA, A CORPORATION OF PENNSYLVANIA.

PIPE-HANGER.

SPECIFICATION forming part of Letters Patent No. 709,815, dated September 23, 1902.

Application filed February 15, 1902. Serial No. 94,264. (No model.)

*To all whom it may concern:*

Be it known that I, HARRY S. COLLINS, a citizen of the United States, residing at Pittsburg, in the county of Allegheny and State of Pennsylvania, have invented a new and useful Improvement in Pipe-Hangers, of which improvement the following is a specification, reference being had therein to the accompanying drawings, in which—

Figure 1 indicates an elevation of my improved pipe-hanger, showing a section of pipe supported thereby; Fig. 2, a plan view; Fig. 3, an elevation, partly in section; Fig. 4, an elevation of the strap or stirrup. Figs. 5 and 6 are details of ring and nut, respectively; and Fig. 7 is a section on line 6 6 of Fig. 5.

My invention relates to improvements in pipe-hangers, and particularly to improvements in the hanger patented by me by Letters Patent No. 649,270, dated May 8, 1900.

The object of my present invention is the provision of means to prevent the suspending stirrup or strap dropping off the pipe or becoming disengaged in the event of its being elevated or raised in any wise, also to simplify the construction and reduce the cost of manufacture thereof; and to these purposes my invention consists in the novel construction and disposition of parts hereinafter more fully described, reference being had to the accompanying drawings, forming part of this specification, in which like reference characters indicate like parts wherever they occur throughout the several views.

Referring to said drawings, 1 1 are straps, the lower ends of which overlap and are hinged or pivotally connected by the bolt 2 and when so connected form a stirrup, within which the pipe $x$ is supported. The upper inner ends of said straps are provided with projections or hooks 5 5, which are adapted to be seated in the recesses or pockets 3 3, formed in opposite sides of the ring 4, which is loosely mounted and freely movable upon the cylindrical part $a$ of the nut 6. The said nut at or near the lower end thereof is provided with a flange 7, which is of greater diameter than the opening in said ring or collar, forming a support or bearing for said ring when the device is operatively disposed. The said nut 6 is also provided with laterally-projecting abutments or lugs 8 8, formed thereon a distance above said flange equal to the height of the ring 4 and adapted when the nut is turned or revolved to bring the lugs 8 8 in alinement with the recesses 3 3 in the ring and to engage the upper inner side of the hooks 5 5 when seated in the recesses, as shown in Figs. 1 and 3, and thus prevent the hooks or projections from being lifted out of the recesses in the event of the stirrups being elevated. When it is desirable to release the hooks, the nut is turned sufficient to carry the lugs out of alinement with the recesses, thus permitting the hooks to be released or lifted out of the same.

The nut 6 may be internally threaded to receive a correspondingly-threaded suspending bolt or screw to admit of the hanger being adjusted vertically.

I claim as my invention and desire to secure by Letters Patent—

1. A pipe-hanger comprising two straps, the lower ends of which are pivotally connected and the upper ends having hooks or projections, a ring or collar having pockets in opposite sides thereof adapted to be brought into alinement with the hooks or projections on said straps and in which recesses said hooks are adapted to be seated, an interiorly-threaded nut loosely fitting in said ring or collar having a flange of greater diameter than the opening in said ring, and laterally-projecting abutments adapted to be brought into alinement with and close the top of said pockets.

2. In a pipe-hanger, the combination of a stirrup, comprising two straps pivotally connected at their lower ends and provided with projections near their upper ends, a collar having pockets in opposite sides thereof adapted to receive the projections on said straps, a nut having a flange of greater diameter than the opening in said collar, an adjacent cylindrical surface fitting loosely in said opening, and laterally-projecting abutments adapted to be brought into alinement with and close the top of said pockets and prevent the projections on said straps from being lifted thereout.

In testimony whereof I have hereunto signed my name in the presence of two subscribing witnesses.

HARRY S. COLLINS.

In presence of—
CLARENCE A. WILLIAMS,
JOHN H. RONEY.